US012771526B2

(12) United States Patent
Vrubel et al.

(10) Patent No.: US 12,771,526 B2
(45) Date of Patent: Oct. 20, 2026

(54) CRYPTOCURRENCY MINING SITE OPTIMIZER

(71) Applicant: Chain Reaction, Ltd., Tel Aviv (IL)

(72) Inventors: Oren Vrubel, Tel Aviv (IL); Gal Binderman, Kibbutz Shefayim (IL); Rony Gutierrez, Pardes-Hana-Karkur (IL); Chun-Yu Chen, San Jose, CA (US)

(73) Assignee: Chain Reaction, Ltd., Tel Aviv (IL)

( * ) Notice: Subject to any disclaimer, the term of this patent is extended or adjusted under 35 U.S.C. 154(b) by 91 days.

(21) Appl. No.: 18/737,246

(22) Filed: Jun. 7, 2024

(65) Prior Publication Data

US 2025/0379721 A1 Dec. 11, 2025

(51) Int. Cl.
*H04L 29/00* (2006.01)
*H04L 9/06* (2006.01)

(52) U.S. Cl.
CPC ........ *H04L 9/0643* (2013.01); *H04L 2209/56* (2013.01)

(58) Field of Classification Search
CPC .......................... H04L 9/0643; H04L 2209/56
See application file for complete search history.

(56) References Cited

U.S. PATENT DOCUMENTS 10,142,098 B2 11/2018 Suresh et al.
10,313,108 B2 6/2019 Suresh et al.
10,608,433 B1 3/2020 McNamara et al.
10,764,325 B2 9/2020 Suraparaju
11,100,510 B1 * 8/2021 Wyner .................. G06F 21/602
11,631,138 B2 4/2023 Fresa
12,499,169 B2 * 12/2025 Lyngbaek ........... G06F 16/9566
12,505,478 B2 * 12/2025 Huang ............... G06Q 30/0631
2020/0007313 A1 * 1/2020 Vouk ....................... H04L 63/12
2020/0167237 A1 * 5/2020 Knuhtsen ................ G06F 3/067
2020/0175617 A1 * 6/2020 Martinez ............ G06Q 20/0855
2020/0302363 A1 * 9/2020 Maar .................... A01D 34/866
(Continued)

FOREIGN PATENT DOCUMENTS

CN 110474818 A * 11/2019 ......... H04L 67/1065
CN 112037873 A * 12/2020 .......... G06F 11/1464
(Continued)

OTHER PUBLICATIONS

"A Novel Optimization for GPU Mining Using Overclocking and Undervolting"; Mohammed Shuaib, Sumit Badotra, Muhammad Irfan Khalid, Abeer D. Algami, , Syed Sajid Ullah, Sarni Bourouis, Jawaid Iqbal, Salil Bharany, and Lokesh Gundaboina; Jul. 16, 2022 MDPI (Year: 2022).
(Continued)

*Primary Examiner* — Don G Zhao
(74) *Attorney, Agent, or Firm* — M&B IP Analysts, LLC

(57) ABSTRACT

According to a first aspect of the present disclosed subject matter, a Miner Profit Optimizer (MPO), comprising: a site optimization processor (SOP) communicatively connected to at least one engine profit-optimization engine via an input-output module; and a memory module comprising miner's status information, wherein the SOP concurrently calculates and broadcasts updated breakeven efficiency and operational policy to the at least one engine based on its status information.

4 Claims, 4 Drawing Sheets

(56) References Cited

U.S. PATENT DOCUMENTS

| | | | | |
|---|---|---|---|---|
| 2023/0186290 | A1* | 6/2023 | Navon | G06Q 20/3823 705/64 |
| 2024/0413974 | A1* | 12/2024 | Pal | H04L 9/0643 |
| 2024/0419230 | A1* | 12/2024 | Archer | G06F 1/263 |
| 2025/0286716 | A1* | 9/2025 | Fathalla | H04L 9/3073 |
| 2025/0378436 | A1* | 12/2025 | Lochrane | G06Q 20/065 |
| 2025/0379721 | A1* | 12/2025 | Vrubel | H04L 9/0643 |

FOREIGN PATENT DOCUMENTS

| | | | | | |
|---|---|---|---|---|---|
| CN | 112950404 | A | * | 6/2021 | G06Q 50/06 |
| CN | 118870431 | A | * | 10/2024 | H04L 67/104 |

OTHER PUBLICATIONS

"Dynamic Power Control for Rational Cryptocurrency Mining"; Sang-Yoon Chang, Simeon Wuthier; Sep. 25, 2020 Cryblock. (Year: 2020).

* cited by examiner

CRYPTOCURRENCY MINING SITE OPTIMIZER

TECHNICAL FIELD

The present disclosed subject matter relates to cryptocurrency mining. More particularly, the present disclosed subject matter relates to mining optimization throughout a mining process.

BACKGROUND

Bitcoin is built on the principles of decentralization, transparency, security, and immutability. It operates on a global network of computers, free from central control, making it resistant to censorship and single points of failure. Founded on blockchain technology, all Bitcoin transactions are recorded on a distributed public ledger, visible to anyone and it enhances trust in the system. Transactions are secured through cryptographic techniques, validated by the Proof of Work consensus mechanism, ensuring their integrity. Once confirmed, transactions are practically irreversible, maintaining the tamper-proof nature of the blockchain's transaction history.

Peers participate in Bitcoin mining by solving the hash function for each new block, with each block containing newly mined Bitcoins, capped at 21 million. The solving peer receives a reward known as a Coinbase transaction, halved approximately every 210,000 blocks, marking a significant event occurring roughly every four years. The block mining rate targets around 10 minutes, maintained by adjusting hash difficulty through consensus, independent of total network computational power. Solving the hash function requires repeated calculations and constitutes Proof-of-Work, converting electricity into Bitcoin. Currently, Bitcoin mining is profitable solely with dedicated hardware operated by large data centers. It should be noted that the rate of solving the hash function, i.e., hash-rate, impacts mining profitability.

The Bitcoin mining network operates as a decentralized system of computers (nodes) responsible for validating and securing transactions on the Bitcoin blockchain through mining. Key aspects include decentralization, where thousands of globally distributed nodes contribute computational power to prevent central authority control. Specialized computers, or mining nodes, compete to solve complex puzzles (Proof of Work) to validate transactions and add blocks to the blockchain. Miners often join pools to combine resources and increase rewards, distributed based on contribution. Rewards include block rewards and transaction fees, while network difficulty adjusts to maintain a consistent block time, ensuring security and consensus with transactions confirmed by multiple blocks. Overall, the network upholds blockchain security, decentralization, and integrity, enabling peer-to-peer transactions without intermediaries.

Bitcoin mining outcome refers to the consequence of the mining process, which involves validating and processing transactions on the Bitcoin network. The outcome of Bitcoin mining includes Block Validation, Block Reward, Transaction Confirmation, and Network Security. Mining expenses [$/sec] are directly proportional to Hashrate×η×Electricity Price, where (η) is power efficiency measured in joules per tera-hash [J/TH].

Bitcoin mining revenue is generally based on block reward plus transaction fees (both are derived from the Bitcoin price) minus electricity costs, multiplied by mining efficiency. The block reward is the number of newly created bitcoins awarded to the miner who successfully mines a new block. Currently, as of Apr. 19, 2024, the reward stands at 3.125 bitcoins per block and halves approximately every four years. Transaction fees are additional earnings for miners, varying with network congestion and transaction urgency. The efficiency (η) is the power efficiency of the mining hardware, and the electricity cost (price) of power required for mining. Mining revenue [/sec] is directly proportional to $$\frac{\text{Hashrate} \times BTCPrice}{\text{Net\_Diff}} * \text{block reward},$$

where Net_Diff is the network difficulty.

Mining profit can be expressed in terms of efficiency, and since all of its parameters are time-dependent, it is a continuous function of time: η(t) [J/TH]. The function is also dependent on a hash-rate and other specific miner parameters. The Mining Profit Function (MPF) is η(t) [J/TH] and can be used to determine the profit gained by each miner with respect to any given time interval, in addition to calculating the real-time profit "breakeven" point. This point signifies the moment at which mining can no longer "self-fund" itself by liquidating BTC, and therefore, the operation of the miner is stabilized around such a breakeven point.

The primary processing elements of a Cryptocurrency Mining System (CMS) are built upon a multitude of Application-Specific Integrated Circuits (ASICs). Additionally, it is worth mentioning that throughout this disclosure, the terms CMS and ASIC may be used interchangeably.

The continuous efficiency of a miner using a Cryptocurrency Mining System (CMS) also depends on the CMS process and binning, i.e., performance; aging, mining power consumption ($P_m$), time (t), and ASICs junction ($T_j$). That is, the continuous efficiency ($\eta_i$) can be represented as follows:

$$\eta_i(t, P_m, T_j)[J/TH].$$

It should be noted that the dependency on time (t) is indirect and may be a function of a number of variables such as the aging of a miner, binning, power supply to the miner, and so on.

FIG. 1 depicts a chart 100 illustrating the performance of commercially available Cryptocurrency Mining Systems (CMS). As observed in the chart 100, the performance of CMS is primarily dependent upon the physical properties of the mining ASICs, particularly and generally, as obtained from commercially available CMSs.

Power 101 of FIG. 1 is the horizontal x-axis, which represents power [Watts], while the vertical y-axis represents Mining Performance (MP) 102, given in [TH/sec], [J/TH], and [TH/J].

Curve 110 depicts hash-rate (HR) performance with respect to power (P) and corresponds to units of [TH/sec] in MP 102. Curve 120 illustrates mining efficiency with respect to power dHR(P)/dp' i.e., the derivative of ΔHR with respect to ΔP, and corresponds to units of [TH/J] in MP 102. Curve 130 represents mining profitability $$[dJ/dTH - \bar{\eta}(t)], \text{ where } dJ/dTH = (dHR(P)/dP)^{-1},$$

and corresponds to units of [J/TH] in MP 102.

It can be concluded from the behavior of curves 110 and 120 that when mining power (Pm) increases, the additional mining performance (ΔHR) added due to it decreases. As requested from curve 120, it's important to highlight, that the miner's absolute efficiency holds no significance, as what truly matters is the efficiency derivative $$dJ/dTH$$

concerning the breakeven efficiency $\tilde{\eta}(t)$. While, $$dJ/dTH - \tilde{\eta}(t) < 0,$$

the profit from increasing the hash-rate is greater than the additional power costs. However, it is not maximized. While, $$dJ/dTH - \tilde{\eta}(t) > 0,$$

the profit from increasing the hash rate is smaller than the additional power costs.

It will be appreciated that mining operation at best efficiency or maximum hash-rate (maximum $P_m$) doesn't yield optimal profitability. Therefore, the present disclosure's objective is to optimize the profitability of cryptocurrencies, such as Bitcoin.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

According to a first aspect of the present disclosed subject matter, a Miner Profit Optimizer (MPO), comprising: a site optimization processor (SOP) communicatively connected to at least one engine profit-optimization engine via an input-output module; and a memory module comprising miners status information, wherein the SOP concurrently calculates and broadcasts updated breakeven efficiency and operational policy to the at least one engine based on its status information.

In some exemplary embodiments, the SOP is communicatively connected to a plurality of engines via a grid encompassing the plurality of engines.

In some exemplary embodiments, the grid facilitates communication between the internal and the MPO.

In some exemplary embodiments, the SOP is configured to: obtain at least one of: bidding data, financial information, real-time cryptocurrency market status, and profitability calculations.

According to another aspect of the present disclosed subject matter, a profit optimization method for one or more miners, comprising: providing, by a site optimization processor, operational policies at least one profit-optimization engine, wherein each engine of the one or more engines controls one miner of the one or more miners; broadcasting calculated breakeven efficiency points to the engines; determining, with the engines, most profitable miners; calibrating, by the engines an optimal profit point of the one or more miners; and computing a minimum bidding value for curtailment In some exemplary embodiments, the operational policies align with the miner's efficiency derivative to ensure that each miner satisfies its mining power policy.

In some exemplary embodiments, the method further comprising determining the most profitable miners.

In some exemplary embodiments, the site optimization processor monitors miners' power levels, ensuring that the total consumed power of all miners is smaller than the total available power.

In some exemplary embodiments, the site optimization processor utilizes the engines to continuously calibrate the optimal profit point of each miner, wherein. the optimal profit point of each miner is based on a predetermined table of working points comprising thermal management, an acquisition algorithm and hash-rate performance.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosure will be apparent from the following detailed description taken in conjunction with the accompanying drawings.

In the drawings.

DETAILED DESCRIPTION

Figure 1:
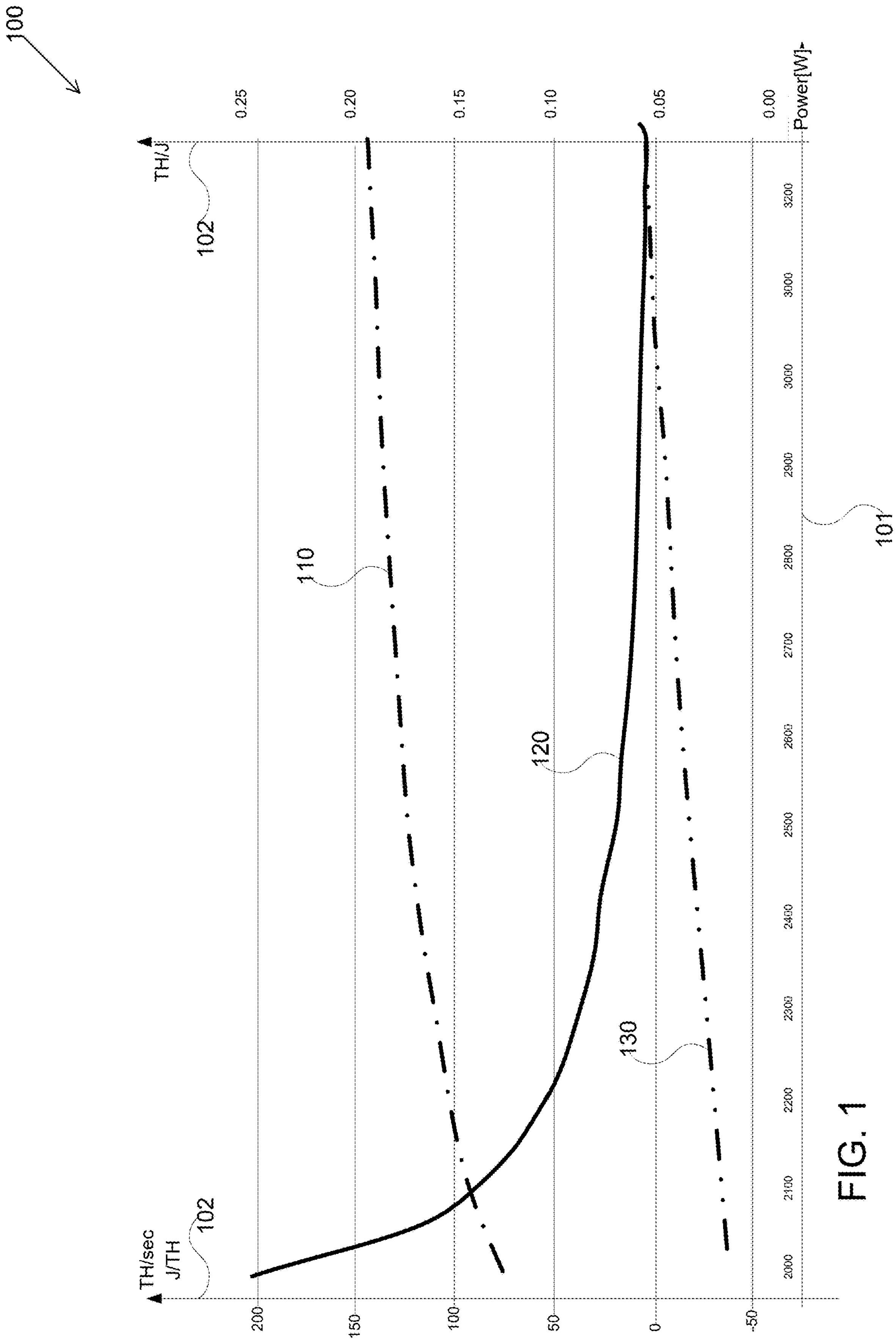
FIG. 1 shows a chart depicting the performance of commercially available Cryptocurrency Mining System (CMS)

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

The technical problem addressed by the disclosed subject matter is that efficiency in cryptocurrency mining is heavily reliant on hardware factors such as processing capabilities, binning, aging, power consumption, and temperature. This efficiency, denoted as ηi (t, Pm, Tj), measured in Joules per Tera-hash (J/TH), fluctuates based on variations in time (t), power consumption (Pm), and an ASIC junction temperature (Tj). When power consumption (Pm) increases by ΔP, the corresponding increase in hash-rate (ΔHR) is nonlinear, complicating profit calculations. Profitability is further influenced by the derivative of efficiency (dJ/dTH) concerning the adjusted efficiency ñ(t). The time (t) is an indirect function of a number of parameters.

One of the technical solutions provided by the present disclosure is the provision of a real-time optimizer capable of continuously regulating resources and physical conditions of miners (Cryptocurrency Mining Systems) and mining setups in real-time (fraction of seconds). In some exemplary embodiments, the real-time optimizer of the present disclosure continuously computes the derivative of the efficiency of the miner relative to required profitability, specifically the relationship between hash-rate and miner operation costs over time, thereby continuously operating the miner at the best profitability working point.

Therefore, it should be understood that the operations described herein cannot be performed using the human mind or by performing the operation using paper and pencil. Moreover, a human operator applies subjective criteria to select/simulate/predict, leading to results that are not consistent between different human operators, and often not consistent between the same human performing the same task repeatedly, and in particular at the speeds required to provide an operable solution. The number of possible permutations for KPIs, parameter range adjustments, and parameter value selection far exceed any practical use of the human mind.

Figure 2:
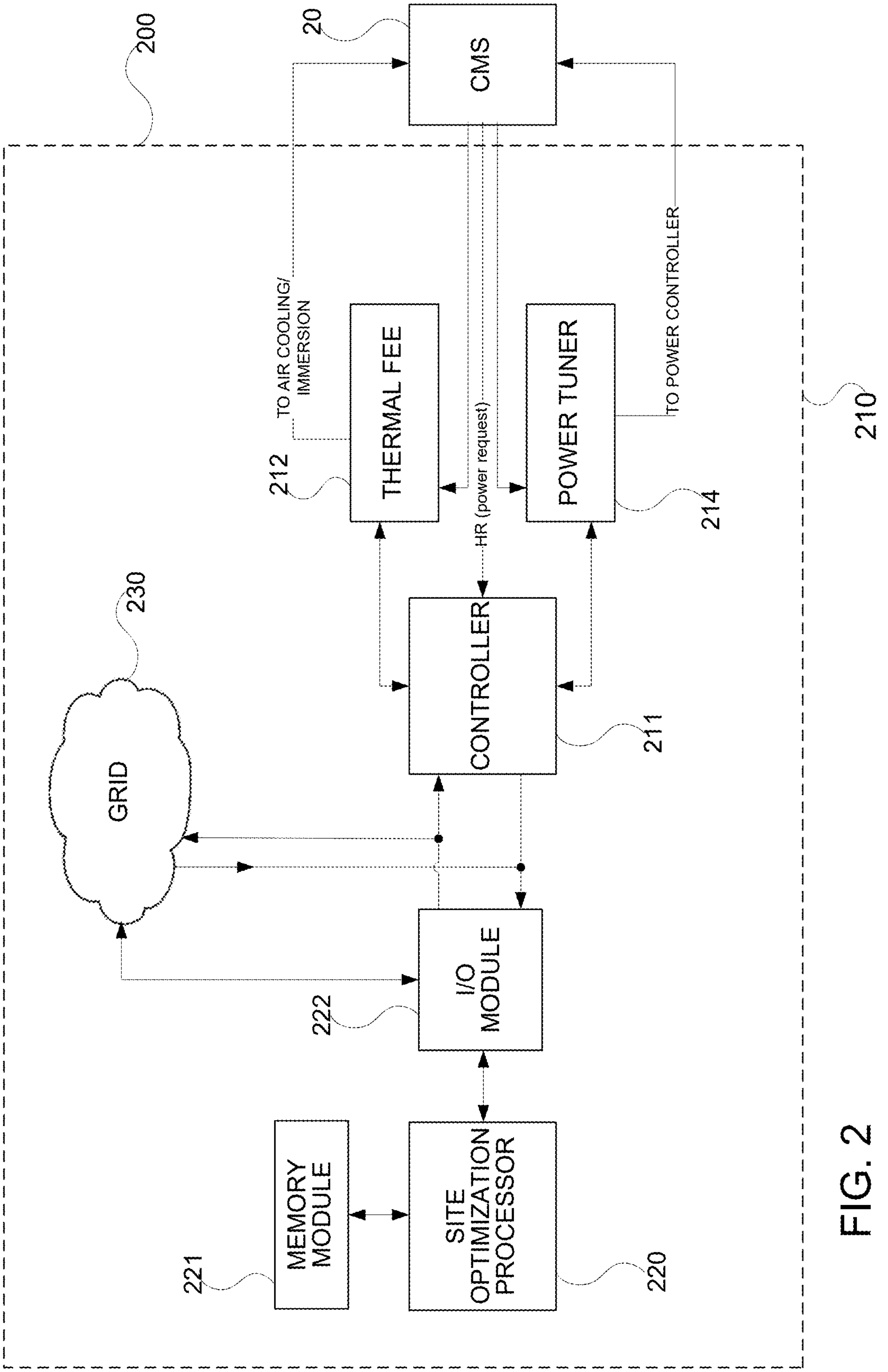
FIG. 2 shows a block diagram of an optimizer, in accordance with some of the disclosed embodiments.

FIG. 2 shows a block diagram of a Miner Profit Optimizer (MPO) 200, in accordance with some exemplary embodiments of the disclosed subject matter. MPO 200 is provided for optimizing cryptocurrency, such as Bitcoin mining.

The present disclosed subject matter relates to cryptocurrency mining. More particularly, the present disclosed subject matter relates to mining optimization throughout a mining process.

MPO 200 is provided to optimize the mining of cryptocurrencies, such as Bitcoin, using commercially available Cryptocurrency Mining Systems (CMSs) 20, MPO 200, objective is to generate maximum mining profitability. CMS 20 also known as mining ASIC (Application-Specific Integrated Circuit) is specialized hardware designed for cryptocurrency mining, for proof-of-work based cryptocurrencies like Bitcoin. CMS 20 is a preferred choice, especially in large-scale mining operations.

In some exemplary embodiments, MPO 200 may include an Optimization Engine 210 that can operate in a Dynamic Key Performance Indicator (Dynamic-KPI) configuration, a Mono Mining Optimizer (MonoMineOpt) configuration; and a Multi Mining Optimizer (MultiMineOpt) configuration (to be described in detail further below).

In the Dynamic-KPI configuration, Optimization Engine 210 enables swift switching between predetermined KPI hashing modes to prioritize performance metrics in cryptocurrency mining. These modes adjust the hash-rate and power consumption to boost efficiency and profitability based on predefined criteria. Furthermore, Optimization Engine 210 enables transitions based on preset KPI settings, facilitating rapid performance adjustments through voltage (V) and frequency (f) control. This feature aids in power management and optimizes the thermal management of CMS 20, maximizing performance while minimizing aging effects.

In some exemplary embodiments, the MonoMineOpt configuration may be utilized as an autonomous apparatus, meaning it is agnostic to any site-level considerations. Additionally, or alternatively, the MonoMineOpt configuration allows for setting CMS 20 to operate up to a predetermined efficiency, maximum performance, and self-shutdown in cases of efficiency below the calculated breakeven point.

It should be noted that in addition to profit optimization, utilizing Optimization Engine 210 also compensates for the aging and degradation effects of CMS 20.

In some exemplary embodiments, Optimization Engine 210 may include a Controller 211. Controller 211 may be a real-time Central Processing Unit (CPU), such as a microprocessor, an electronic circuit, an Integrated Circuit (IC), or the like. Additionally, or alternatively, the real-time Controller 211 can be implemented as firmware written for or ported to a specific processor such as a Digital Signal Processor (DSP) or microcontroller or can be implemented as hardware or configurable hardware such as field programmable gate array (FPGA) or as an application specific integrated circuit (ASIC). Controller 211 may be utilized to perform computations required by Optimization Engine 210 or any of its subcomponents.

In some exemplary embodiments, Controller 211 may include either a persistent or a volatile Memory Unit (not shown). Memory Unit (not shown) may be based on technologies such as semiconductor, magnetic, optical, flash, a combination thereof, or the like.

For example, a memory unit (not shown) can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like.

Figure 4:
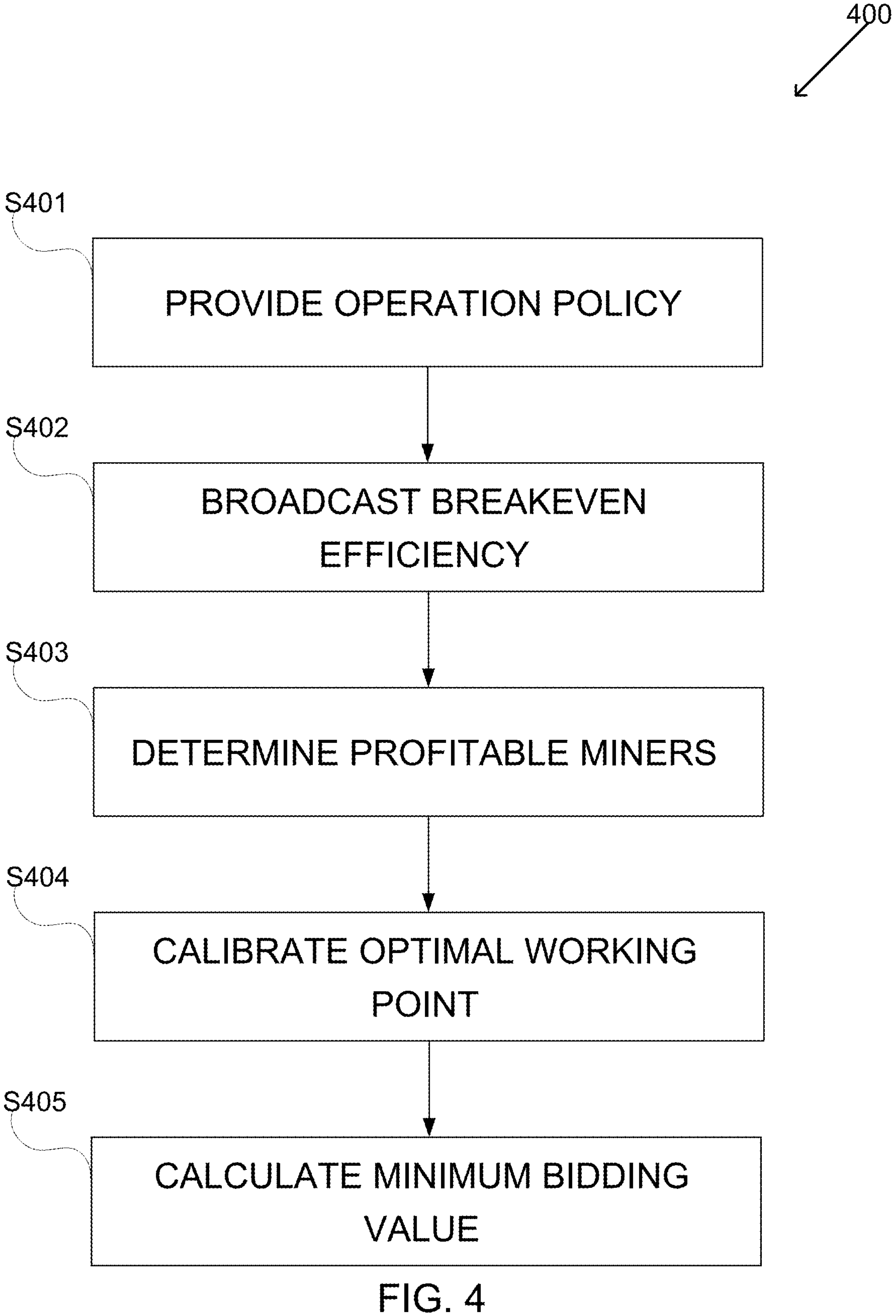
FIG. 4 shows a flowchart diagram of a method, in accordance with some of the disclosed embodiments.

In some exemplary embodiments, the Memory Unit (not shown) may retain a program's code and input instructions used to activate Controller 211 to perform acts associated with any of the steps shown in FIG. 4. The Memory Unit (not shown) may also be used to retain a program's code, input instructions, and libraries required by Controller 211 for calculating and determining: the Mining Profit Function (MPF) $\eta(t)$, hash-rate, mining power, hash-rate performance, mining efficiency, mining profitability, and the like, or any combination thereof.

Additionally, or alternatively, the Memory Unit (not shown) may also retain live status information indicating a CMS's 20 varying physical conditions, such as operating temperature and electrical power usage, which may be used by Controller 211 for continuously controlling (adjust) through voltage (V), frequency (f) and cooling the physical conditions of the CMS 20.

The components detailed above may be implemented as one or more sets of interrelated computer instructions, executed for example by Controller 211 or by another processor. The components may be arranged as one or more executable files, dynamic libraries, static libraries, methods, functions, services, or the like, programmed in any programming language and under any computing environment.

In some exemplary embodiments, Optimization Engine 210 may include a Thermal Frontend Electronics (FEE) 212 and a Power Tuner 214 interfaces. Optimization Engine 210 may be utilized to receive real-time temperature (Tj) information of the miner's ASICs and transmit instructions between Controller 211 and a CMS 20.

In some exemplary embodiments, FEE 212 may be designed as electronic circuitry to acquire signals indicating the temperature of at least one component of a CMS 20. FEE 212 may also generate signals that activate either air cooling or immersion cooling apparatuses for controlling the CMS's 20 thermal conditions.

In some exemplary embodiments, Tuner 214 may be designed as electronic circuitry to acquire signals indicating real-time actual power consumption of at least one component of a CMS 20. Tuner 214 may also generate signals adapted to tune the power consumed by the CMS 20. It should be noted that Tuner 214 adjusts the power by modifying the frequency (f) and/or the voltage supplied (V) to the CMS 20.

In some exemplary embodiments, Controller 211 may be configured for receiving instructions and providing CMS 20 status to a Site Optimization Processor (SOP) 220 (to be described in detail further below).

In some exemplary embodiments, Controller 211 may be configured to control CMS 20 operation mode, for example, KPI modes, and receive miner's requests, such as HR changes and/or power changes.

In some exemplary embodiments, Controller 211 may be configured to communicate with a Workstation (not shown) to alter tables, parameters, and program applications of Optimization Engine 210. However, it will be appreciated that Optimization Engine 210 can operate without human intervention.

In some exemplary embodiments, MPO 200 further includes a Site Optimization Processor (SOP) 220, a Memory Module 221, an Input/Output (I/O) Module 222, and a Grid 230 to facilitate the MultiMineOpt configuration. In the MultiMineOpt configuration, SOP 220 and its supporting components are utilized as a host computer acting as a master that controls a plurality of Optimization Engines 210. Each of the Optimization Engines 210 controls one or more CMS 20, which may be deployed in one or more venues (sites). It should be noted that the term "site" refers to a plurality of CMS 20 deployed in one or more venues and that they are controlled by one SOP 220.

In some exemplary embodiments, SOP 220 may be a Central Processing Unit (CPU), such as a microprocessor, an electronic circuit, an Integrated Circuit (IC), or the like. Additionally, or alternatively, SOP 220 can be implemented as firmware written for or ported to a specific processor such as a Digital Signal Processor (DSP) or microcontroller, or it can be implemented as hardware or configurable hardware such as a field-programmable gate array (FPGA) or as an application-specific integrated circuit (ASIC). In some exemplary embodiments, SOP 220 may be utilized as a host computer configured to control a plurality of Optimization Engines 210 via Grid 230, and perform computations required by MPO 200 or any of its subcomponents, and perform acts associated with any of the steps shown in FIG. 4.

In some exemplary embodiments, Memory Module 221 may be either a persistent or a volatile Memory. Memory Module 221 can be based on technologies such as semiconductor, magnetic, optical, flash, a combination thereof, or the like.

For example, Memory Module 221 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like.

In some exemplary embodiments, Memory Module 221 may retain program code and input instructions used by SOP 220 to perform acts associated with any of the steps shown in FIG. 4. Memory Module 221 may also be used to retain program code, input instructions, and libraries required by SOP 220 for calculating and determining the Mining Profit Function (MPF) $\eta(t)$, hash-rate, mining power, hash-rate performance, mining efficiency, mining profitability, and the like, or any combination thereof for each Optimization Engine 210 in Grid 230.

Additionally, or alternatively, the Memory Module 221 may also retain live status information indicating the CMSs' 20 varying physical conditions, such as operating temperature and electrical power usage, which may be used for determining the profitability of each CMS 20 in Grid 230.

The components detailed above may be implemented as one or more sets of interrelated computer instructions, executed, for example, by SOP 220 or by another processor. The components may be arranged as one or more executable files, dynamic libraries, static libraries, methods, functions, services, or the like, programmed in any programming language and under any computing environment.

In some exemplary embodiments, I/O Module 222 may be utilized by SOP 220 as an interface to transmit and/or receive information and instructions between MPO 200 and external I/O devices, such as any Optimization Engine 210 either directly or via Grid, a Workstation (not shown), the Internet (not shown), or the like.

In some exemplary embodiments, I/O Module 222 may be used to obtain status from and provide instructions to at least one Optimization Engine 210, either directly or via Grid 230. The statuses may include thermal conditions, power consumption, hash-rate, setpoints requests, efficiency, performance, profitability, and the like, or any combination thereof of the at least one Optimization Engine 210 in Grid 230. In some exemplary embodiments, instructions provided by SOP 220 via I/O Module 222 to the at least one Optimization Engine 210 may overrule or alter the Optimization Engine 210 determination to the point of shutting down one or more CMSs 20.

In some exemplary embodiments, the Internet (not shown) connection may be established through Grid 230, which connects MPO 200 to the Internet. The Internet (not shown) may facilitate the process of communicating with external or internal servers for obtaining bidding data, financial information, real-time Bitcoin market status, and any real-time data that may facilitate profitability calculations conducted by SOP 220.

In some exemplary embodiments, I/O Module 222 may be used to provide an interface to MPO 200 users, such as output, visualized results, reports, or the like. Users (miners) may use the Workstation to input information, setpoints, and mining control factors, such as hash-rate, power setup, cooling factors, and other mining instructions, or any combination thereof. However, it will be appreciated that MPO 200 can operate without user intervention.

In some exemplary embodiments, Grid 230 can be a communication network designed to interface between at least one SOP 220 and at least one CMS 20 through its dedicated Optimization Engine 210. Grid 230 may be implemented as a Local Area Network (LAN), a Wide Area Network (WAN), and the like, or any combination thereof.

In some exemplary embodiments, Grid 230 may comprise at least one SOP 220 and a plurality of Optimization Engine 210, each supporting at least one CMS 20, deployed within one or more sites.

Grid 230 enables network elements, such as SOPs 220 and Optimization Engines 210, to communicate and share information, instructions, and resources like files and internet connections. In some exemplary embodiments, the physical connection media may include Ethernet cables, Wi-Fi, and the like, or any combination thereof, for connecting the network elements via routers or switches.

It should be noted that the MultiMineOpt SOP 220 continuously calculates and broadcasts the breakeven efficiency $\tilde{\eta}(t)$, which is independent of individual miner hardware states, along with operational policy. These operational policies include intrinsic support features such as fees, power contracts, curtailment, and grid bidding. In some exemplary embodiments, SOP 220 measures the total power, independently set by each miner, and repeatedly calculates and broadcasts updated $\tilde{\eta}(t)$ under the total power budget. Curtailment may rely on grid bidding supported by external tools. Any curtailment bid is translated into a total power penalty, ensuring optimization is maintained.

Figure 3:
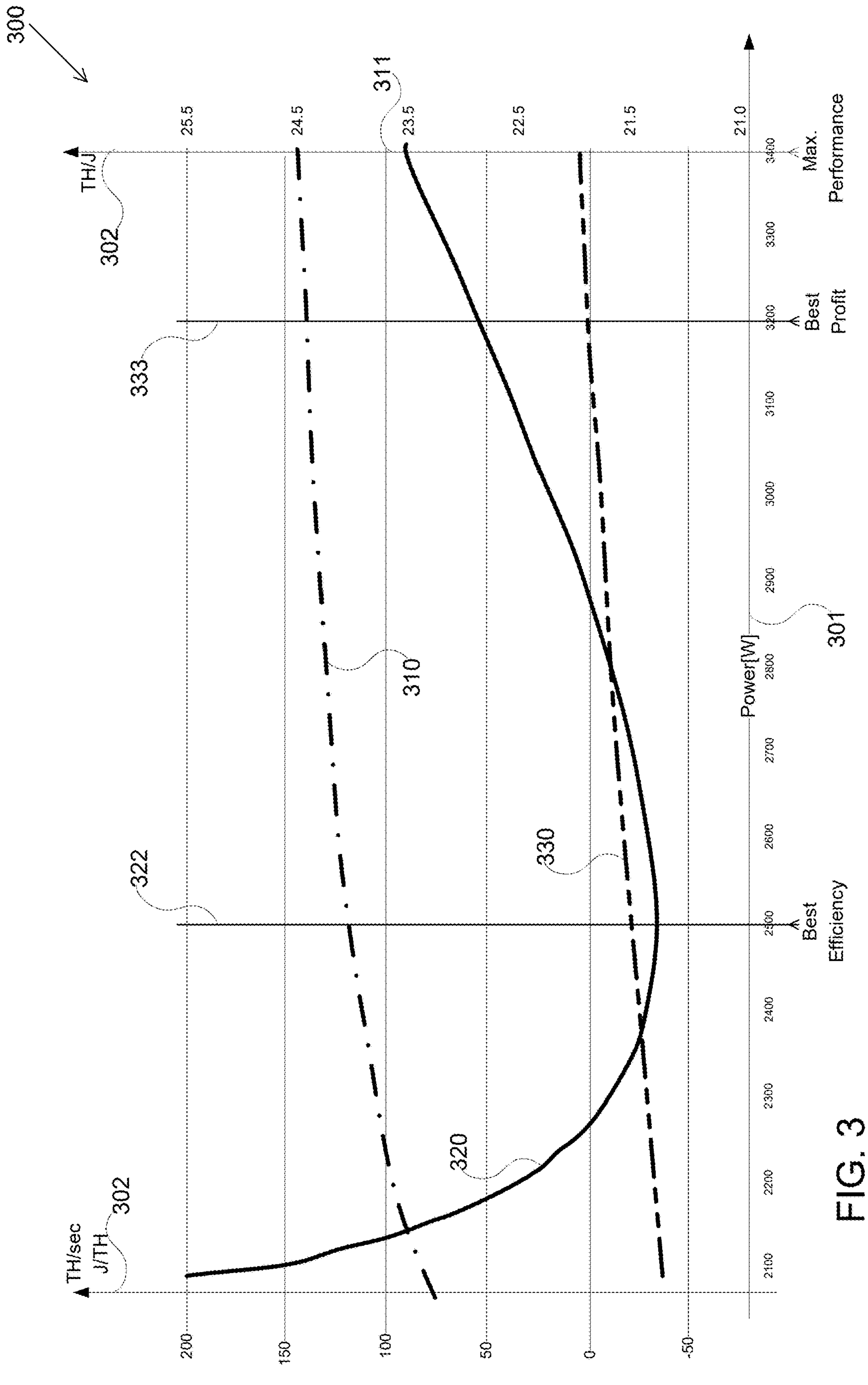
FIG. 3 shows a chart depicting the performance of a CMS governed by the optimizer of the disclosed embodiments.

FIG. 3 shows a chart 300 depicting the performance of CMS 20 governed by the Optimization Engine 210, in accordance with some exemplary embodiments of the disclosed subject matter.

As observed from the chart, the performance of CMS is primarily dependent on the physical properties of the mining ASICs, particularly and generally, as obtained from commercially available CMSs.

Power 301 of FIG. 3 is the horizontal x-axis, which represents power [Watts], while the vertical y-axis represents Mining Performance (MP) 302, given in [TH/sec], [J/TH], and [TH/J].

Curve 310 depicts hash-rate (HR) performance with respect to power (P) and corresponds to units of [TH/sec] in MP 302. Curve 320 illustrates power efficiency corresponds to units of [J/TH] in MP 302. Curve 330 represents mining profitability $$\left[dJ/dTH - \tilde{\eta}(t)\right], \text{ where } dJ/dTH = \left(dHR(P)/dP\right)^{-1},$$

and corresponds to units of [J/TH] in MP 302.

It will be reminded that the miner's best efficiency working Point 322 holds no significance, as what truly matters is the efficiency derivative $$dJ/dTH$$

concerning the breakeven efficiency $\tilde{\eta}(t)$. While, $$dJ/dTH - \tilde{\eta}(t) < 0,$$

the profit from increasing the hash rate is greater than the additional power costs, however, it is not maximized. While, $$dJ/dTH - \tilde{\eta}(t) > 0,$$

the profit from increasing the hash rate is smaller than the additional power costs as depicted by Point 311.

In some exemplary embodiments, maximized profitability with respect to $P_m$ may be achieved by using the Optimization Engine 210 of the present disclosure. This is accomplished by calculating the equation $$\min\{(dJ/dTH - \tilde{\eta}(t)) \geq 0\}$$

and manipulating hash-rate and η to determine the best profit mining point, as depicted in Point 333. It should be noted that operating CMS 20 at the best efficiency or maximum hash-rate would make the mining profit sub-optimal, as depicted in Point 322.

FIG. 4 shows a flowchart 400 outlining an operation of a profit optimization method in Multi Mining Optimizer (MultiMineOpt) configuration, in accordance with some of the disclosed embodiments.

It should be noted that In the MultiMineOpt configuration, SOP 220 and its supporting components are utilized as a host computer acting as a master that controls a plurality of Optimization Engines 210, which may be deployed in different sites.

In the MultiMineOpt configuration, SOP 220 continuously computes and broadcasts $\tilde{\eta}(t)$, along with data including fees and power contracts. In some exemplary embodiments, the SOP broadcasts an optimal (η) for the site. The broadcasted (η) can represent the best efficiency that enables the use of the available power, that is to say up to an (η) that is equal to the breakeven point. However, it should be noted that in the absence of a total power limit, the broadcasting may start with an (η), which represents the breakeven point.

SOP 220 also maintains a real-time log of power, set independently by each miner, and calculates and broadcasts updated $\tilde{\eta}(t)$ within the total power budget. The system also inherently supports curtailment, with grid bidding facilitated by external tools. Any curtailment bid is converted into a total power penalty, ensuring optimization is upheld.

It is noted that the term "miner" used hereinafter refers to a CMS 20 equipped with Optimization Engine 210, wherein each miner is assigned an identifying number (i) by SOP 220, where (i) ranges from 1 to n.

It should be noted that SOP 220 can utilize $\tilde{\eta}(t)$ along with individual miner efficiency measurements, $\eta_i(t, P_m, T_j)$, to deactivate any miner when $\eta_i(t, P_m, T_j) > \eta(t)$. In some exemplary embodiments, Engine 210 stops the miner if (η) is higher than the broadcasted (η). Additionally, or alternatively, The SOP may deactivate miners for various reasons, such as avoiding the simultaneous activation of a large number of miners when the broadcasted efficiency (η) reaches the miner's best efficiency. In such cases, the SOP might skip these critical points to control the rising rate of total power consumption and force miners to shut down.

In S401, an operational policy may be provided to each engine 210. In some exemplary embodiments, the SOP 220 provides an operation policy that aligns with the miner's continuous efficiency derivative to ensure that the miner satisfies the following condition:

$$P_{m,i}(t) = \begin{cases} 0;\ \tilde{\eta}(t) < \eta_{i,min} \\ P_{max};\ \max\{(dJ/dTH_i(t, \Delta P_m, T_j) - \tilde{\eta}(t)) < 0\} \\ \min\{(dJ/dTH_i(t, \Delta P_m, T_j) - \tilde{\eta}(t)) \geq 0\};\ \text{otherwise} \end{cases}$$

In S402, the breakeven efficiency $\tilde{\eta}(t)$ points may be continuously broadcasted by SOP 220 to all miners of a site. In some exemplary embodiments, in addition to broadcasting $\tilde{\eta}(t)$, SOP 220 also utilizes Optimization Engine 210 to monitor miners' power levels, ensuring that the total consumed power of all miners at a site is smaller than the total available power of the site (Pt), i.e., keeping $$\sum_{i=1}^{\#\ of\ miners} P_{m,i}(t) < P_t.$$

In some exemplary embodiments, the available power of $P_{m,i}(t)$ may be set by Optimization Engine 210 of each miner.

In S403, the most profitable miners at one or more sites may be determined. In some exemplary embodiments, the breakeven efficiency $\tilde{\eta}(t)$ may be adjusted to a value below the calculated breakeven efficiency $\tilde{\eta}(t)$ and rebroadcast to the one or more sites until the new condition is satisfied, thereby determining the most profitable miners.

In S404, an optimal profit point of each miner may be calibrated. In some exemplary embodiments, Optimization Engines 210 of each miner continuously determine and calibrate its working point according to the miner's limits, such as thermal management, and an acquisition algorithm based on a predetermined table of working points $$(dJ/dTH).$$

In some exemplary embodiments, the table may be updated by the miner to compensate for aging effects. Additionally, or alternatively, the compensation for aging may be derived also from the miner's HR performance and power consumption measurements.

It should be noted that the greater the speed of the optimizers and their response to power adjustments, the greater the profit. However, even if the working point per miner $$dJ/dTH_i$$

is only partially attained, the profit is still anticipated to exceed that without optimization.

In S405, a minimum bidding value for curtailment may be computed. In some exemplary embodiments, SOP 220 may utilize the following equation to determine the curtailment power reward (PR) for miners:

$$PR_{min}(t)[\$/KW \times Hr] = \frac{\text{Revenue}_t[\$/\text{sec}] \times 3600}{P_t[KW]}.$$

It should be noted that the revenue generated from curtailing power back to the grid (i.e., not consuming) surpasses potential profits from mining. Additionally, the amount of power that needs to be curtailed is determined by the curtailment bid.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional network fabric, storage unit, and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements includes one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A Miner Profit Optimizer (MPO), comprising:

a site optimization processor (SOP) communicatively connected to at least one profit-optimization engine via an input-output module, wherein the at least one profit-optimization engine is configured to control one or more cryptocurrency mining systems; and a memory module comprising live miner status information for the one or more cryptocurrency mining systems, wherein the live miner status information comprises operating temperature and electrical power usage, and wherein the SOP continuously calculates and broadcasts updated breakeven efficiency and an operational policy to the at least one profit-optimization engine based on the live miner status information.

2. The MPO of claim 1, wherein the at least one profit-optimization engine comprises a plurality of profit-optimization engines, each configured to control at least one of the one or more cryptocurrency mining systems, and wherein the SOP is communicatively connected to the plurality of profit-optimization engines via a grid.

3. The MPO of claim 2, wherein the grid connects the MPO to the Internet and facilitates communication between the MPO and one or more external or internal servers.

4. The MPO of claim 2, wherein the SOP is configured to obtain, via the grid, at least one of bidding data, financial information, real-time cryptocurrency market status, or real-time data that facilitates profitability calculations.

* * * * *